US008798087B2

(12) United States Patent
Youn et al.

(10) Patent No.: US 8,798,087 B2
(45) Date of Patent: Aug. 5, 2014

(54) GROUP SCHEDULING METHOD, METHOD FOR SELECTIVELY RECEIVING INFORMATION ELEMENTS ACCORDING TO GROUP SCHEDULING, AND MOBILE COMMUNICATION TERMINAL (75) Inventors: Ae Ran Youn, Anyang-si (KR); Hee Jeong Cho, Anyang-si (KR); Tae Gon Kong, Anyang-si (KR)

(73) Assignee: LG Electronics Inc., Seoul (KR)

( * ) Notice: Subject to any disclaimer, the term of this patent is extended or adjusted under 35 U.S.C. 154(b) by 697 days.

(21) Appl. No.: 12/745,839

(22) PCT Filed: Dec. 2, 2008

(86) PCT No.: PCT/KR2008/007110
§ 371 (c)(1),
(2), (4) Date: Aug. 16, 2010

(87) PCT Pub. No.: WO2009/072791
PCT Pub. Date: Jun. 11, 2009

(65) Prior Publication Data
US 2010/0309860 A1  Dec. 9, 2010

(30) Foreign Application Priority Data
Dec. 3, 2007  (KR) .................. 10-2007-0124208

(51) Int. Cl.
*H04J 4/00* (2006.01)
(52) U.S. Cl.
USPC ............ 370/436; 370/330; 370/431; 370/498
(58) Field of Classification Search
USPC .................... 370/436, 431, 330, 329, 498
See application file for complete search history.

(56) References Cited

U.S. PATENT DOCUMENTS

| 2005/0041573 | A1* | 2/2005 | Eom et al. | 370/208 |
|---|---|---|---|---|
| 2006/0203766 | A1* | 9/2006 | Kim et al. | 370/328 |
| 2006/0239265 | A1* | 10/2006 | Son et al. | 370/390 |
| 2007/0140165 | A1 | 6/2007 | Kim et al. | |
| 2007/0206561 | A1* | 9/2007 | Son et al. | 370/346 |

(Continued)

FOREIGN PATENT DOCUMENTS

| KR | 10-2006-0074283 | 7/2006 |
|---|---|---|
| KR | 10-2007-0080735 | 8/2007 |
| WO | 2007-036073 | 4/2007 |

OTHER PUBLICATIONS

C. Hoymann et al., "Evaluation of Grouping Strategies for an Hierarchical SDMA/TDMA Scheduling Process," IEEE Proceedings International Conference on Communications, Jun. 2007, pp. 5616-5621.

*Primary Examiner* — Omer S Mian
(74) *Attorney, Agent, or Firm* — Lee, Hong, Degerman, Kang & Waimey (57) ABSTRACT

A group scheduling method, a method for selectively receiving information elements according to group scheduling, and a Mobile Station (MS) are provided. The group scheduling method schedules allocation of resources to a plurality of mobile stations by dividing the plurality of mobile stations into at least one group. The group scheduling method includes enabling an index element in a group index corresponding to a group to which a mobile station (MS) scheduled to transmit data belongs and placing a group allocation information element including the group index at the beginning of a MAP. In this method, group scheduling information is transmitted to MSs using a group allocation IE to prevent the MSs from reading unnecessary information transmitted every frame, thereby reducing power consumption of the MSs.

7 Claims, 10 Drawing Sheets

(56) References Cited

U.S. PATENT DOCUMENTS

| | | |
|---|---|---|
| 2007/0223422 A1 | 9/2007 | Kim et al. |
| 2009/0040970 A1* | 2/2009 | Ahmadi et al. ............... 370/329 |
| 2009/0046637 A1* | 2/2009 | Kim et al. ..................... 370/329 |
| 2010/0182932 A1* | 7/2010 | Maheshwarl et al. ........ 370/254 |

* cited by examiner

FIG. 9

# GROUP SCHEDULING METHOD, METHOD FOR SELECTIVELY RECEIVING INFORMATION ELEMENTS ACCORDING TO GROUP SCHEDULING, AND MOBILE COMMUNICATION TERMINAL

CROSS-REFERENCE TO RELATED APPLICATIONS

This application is the National Stage filing under 35 U.S.C. 371 of International Application No. PCT/KR2008/007110, filed on Dec. 2, 2008, which claims the benefit of earlier filing date and right of priority to Korean Application No. 10-2007-0124208, filed on Dec. 3, 2007.

TECHNICAL FIELD

The present invention relates to allocation of resources between a base station and a mobile terminal or Mobile Station (MS) in a broadband wireless access communication system, and more particularly, to a method for transmitting group allocation information according to group scheduling to an MS to reduce power consumption of the MS when reading Information Elements (IEs) and an MS applied to the method.

BACKGROUND ART

First, reference is made to a method for allocating resources in a broadband wireless access system. A base station allocates resources to each terminal (or MS) taking into consideration a channel status (i.e., Channel Quality Information (CQI)), the amount of delay, throughput, and Quality of Service (QoS) of the MS.

In the broadband wireless access communication system, it is necessary to efficiently allocate resources to each of a number of MSs. The following is a detailed description of a method for scheduling allocation of resources.

In a general IEEE 802.16e communication system, a plurality of receivers (for example, MSs) share one channel (for example, a packet data channel) transmitted from a transmitter (for example a base station (BS)). In this case, a single scheduler performs scheduling. This scheduling method is described below with reference to FIG. 1.

Figure 1:
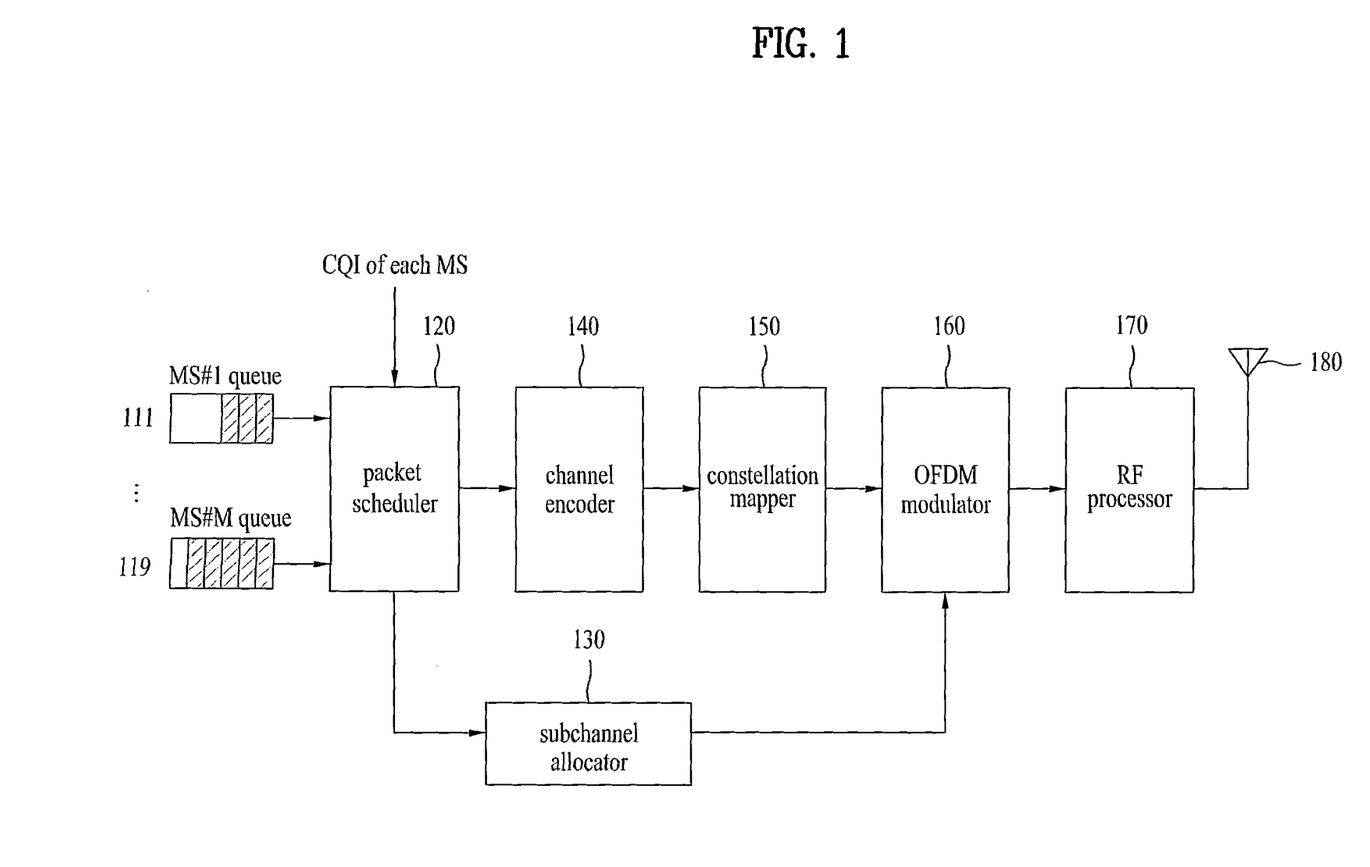
FIG. 1 illustrates an example block diagram of a scheduling device in a Base Station (BS) in an IEEE 802.16e communication system.

FIG. 1 illustrates an internal structure of a scheduling device of a BS in a general IEEE 802.16e communication system. As shown in FIG. 1, the scheduling device includes M MS queues (i.e., 1st to Mth MS queues 111 to 119), a packet scheduler 120, a subchannel allocator 130, a channel encoder 140, a constellation mapper 150, an OFDM modulator 160, a Radio Frequency (RF) processor 170, and an antenna 180.

First, when the number of MSs which are receiving a service from the BS is M (i.e., when 1st to Mth MSs are present), packet data destined for the 1st to Mth MSs are transferred respectively to the corresponding queues. Specifically, packet data destined for the 1st MS is transferred to the 1st MS queue 111 and packet data destined for the Mth MS is transferred to the Mth MS queue 119. When packet data is stored in the 1st to Mth MSs 111 to 119, the packet scheduler 120 performs a control operation such that resources (for example, single-channel resources) of a corresponding scheduling time (for example, Transmit Time Interval (TTI)) are allocated to a specific MS according to a preset scheduling scheme every TTI. Since a single packet scheduler is used in the general IEEE 802.16e communication system, the packet scheduler 120 shown in FIG. 1 is a single packet scheduler.

The packet scheduler 120 outputs allocation information of an MS allocated to a subchannel in the corresponding TTI to the subchannel allocator 130. Here, the allocation information of the MS allocated to the subchannel in the corresponding TTI is determined according to the scheduling operation.

The subchannel allocator 130 allocates the subchannel to the MS in the corresponding TTI according to the allocation information of the MS allocated to the subchannel in the corresponding TTI output from the packet scheduler 120 and outputs the subchannel allocation information to the OFDM modulator 160.

The channel encoder 140 performs channel encoding on data of the MS determined by the packet scheduler 120 according to a preset channel encoding method determined according to CQI of the MS and outputs the encoded data to the constellation mapper 150.

The constellation mapper 150 performs constellation mapping on the signal output from the channel encoder 140 according to a QPSK scheme and outputs the resulting signal to the OFDM modulator 160.

The OFDM modulator 160 OFDM-modulates the signal output from the constellation mapper 150 according to the subchannel allocation information output from the subchannel allocator 130 and outputs the modulated signal to the RF processor 170. Here, a detailed description of the OFDM modulation operation of the OFDM modulator 160 is omitted herein since the OFDM modulation operation is not directly associated with the packet scheduling operation. The RF processor 170 includes components such as a filter and a front end unit and performs RF processing on the modulated signal from the OFDM modulator 160 and transmits the resulting signal through the antenna 180.

The packet scheduler 120 performs a scheduling operation using a Proportional Fairness (PF) scheme.

Here, a Proportionally Fairness Scheduler (PFS) is used to determine terminals that will use Partial Usage of Subchannels (PUSCs) including distributed subcarriers of the OFDMA system. One frame is divided into a number of scheduling resources. The base station sequentially performs PFS until such resources are all allocated. This process is repeated every frame. According to the PFS result, the base station can allocate one or more terminals to one frame. PFS is a method used to select terminals which maximize the value obtained by dividing the maximum amount of data $T\_inst_i$ according to a channel status at a scheduling time "t" by the average amount of actually transmitted data $T\_smoothed_i$ as in Mathematical Expression 1.

$$M_i(t) = \frac{T\_inst_i(t)}{T\_smoothed_i(t)} \quad \text{MATHEMATICAL EXPRESSION 1}$$

At any scheduling instant $t$, the scheduling metric $M_i(t)$ for subscriber $i$ Here, the process of Mathematical Expression 1 is not performed when there is no data to be transmitted to the terminals.

The average data amount which is a denominator in Mathematical Expression 1 is calculated each time after resources are allocated as in Mathematical Expression 2. A parameter "$T_{PF}$" in Mathematical Expression 2 represents the size of a window during which the service can be maintained without receiving data.

MATHEMATICAL EXPRESSION 2

$$\text{T\_smoothed}_i(t) = \frac{1}{T_{PF}} * \text{T\_inst}_i(t) + \left(1 - \frac{1}{T_{PF}}\right) * \text{T\_smoothed}_i(t-1)$$

In Mathematical Expression 2, the current transmission amount "T_insti" of all terminals excluding terminals selected at time "t" is "0".

Table 1 represents QoS of various services. The Unsolicited Grant Service (UGS) is sensitive to transmission delay and the sensitivity of each service to transmission delay decreases in the order given in the table (i.e., the Best Effort (BE) is least sensitive to transmission delay).

TABLE 1

| Service | Definition | Applications | Mandatory QoS Parameters |
|---|---|---|---|
| UGS | Real-time data streams Consisting of fixed-size data Packets issued at periodic Intervals | T1/E1, VoIP w/o silence Suppression | Max. Sustained Traffic Rate = Min. Reserved Traffic Rate Maximum Latency Tolerated Jitter Uplink Grant Scheduling Type Request/Transmission Policy Unsolicited Grant Interval (vender specific) |
| rtPS | Real-time data streams consisting of variable-sized data packets that are issued at periodic intervals | MPEG video | Minimum Reserved Traffic Rate Maximum Sustained Traffic Rate Maximum Latency Uplink Grant Scheduling Type Request/Transmission Policy |
| nrtPS | Delay-tolerant data streams consisting of variable-sized data packets for which minimum data rate is required | FTP | Minimum Reserved Traffic Rate Maximum Sustained Traffic Rate Traffic Priority Uplink Grant Scheduling Type Request/Transmission Policy |
| BE | Data streams for which no Minimum service level is required and therefore may be handled on a space-available basis | HTTP | Maximum Sustained Traffic Rate Traffic Priority Request/Transmission Policy |

The BS transmits information of resources allocated using the above method to MSs through a MAP every frame.

In the case of uplink, such information is transmitted through a UL MAP. The BS can transmits such information through a block allocation scheme in which the BS notifies the MS of a symbol offset, the number of allocated symbols, a subchannel offset, and the number of allocated subchannels or a slot allocation scheme in which the BS notifies the MS of a relative or absolute offset and durations of allocated slots.

Table 2 illustrates the usage of each Uplink Interval Usage Code (UIUC).

| UIUC | Usage |
|---|---|
| 0 | Fast-feedback channel |
| 1-10 | Different burst profiles (Data Grant Burst Type) |
| 11 | Extended UIUC 2 IE |
| 12 | CDMA BR, CDMA ranging |
| 13 | PAPR reduction allocation safety zone, Sounding Zone |
| 14 | CDMA Allocation IE |
| 15 | Extended UIUC |

As illustrated in Table 2, the block allocation scheme is used in fast feedback (UIUC=0), HARQ ACK CH region (UIUC-11 (Extended-2 UIUC) with Type=8), CDMA ranging and BW request allocation (UIUC=12), and PAPR/safety zone allocation (UIUC=13), which should all be allocated to regions prior to regions in which the slot allocation scheme is used.

The slot allocation scheme is used in any other UIUC. When the slot allocation scheme is used in non-Adaptive Antenna System (non-AAS) zones, the start position of an initial region is determined by an allocation start time field in the UL-MAP and the start positions of other allocation regions are determined by immediately previous allocation regions in the UL-MAP (i.e., determined through relative offset values). On the other hand, when the slot allocation scheme is used in an AAS UL zone, the start position of the allocation region is determined by an absolute offset explicitly indicated in the UL-MAP.

In the case of downlink, information of allocated resources is transmitted through the block allocation scheme. Table 3 illustrates the usage of each Downlink Interval Usage Code (DIUC).

TABLE 3

| DIUC | Usage |
|---|---|
| 0-12 | Different burst profiles |
| 13 | Gap/PAPR reduction |
| 14 | Extended-2 DIUC IE |
| 15 | Extended DIUC |

The BS performs scheduling on all MSs that have data to be transmitted and received in the corresponding cell to allocate resources to the MSs and broadcasts such allocation information to the MSs every frame.

Each MS needs to read all Information Elements (IEs) in a MAP transmitted every frame to determine whether or not any resources have been allocated to the MS. This method is inefficient in terms of power consumption of the MS.

DISCLOSURE

Technical Problem

A first object of the present invention devised to solve the problem lies on providing a group scheduling method, wherein group information is generated to prevent each MS from receiving unnecessary IEs, thereby reducing power consumption of the MS.

A second object of the present invention devised to solve the problem lies on providing a method for selectively receiving IEs according to group scheduling, wherein group information broadcast by a BS is used to allow each MS to receive necessary IEs only.

A third object of the present invention devised to solve the problem lies on providing an MS to which the method for selectively receiving IEs according to group scheduling is applied.

Technical Solution

In accordance with an embodiment of the present invention, the first object can be achieved by providing a group scheduling method for scheduling allocation of resources to a plurality of mobile stations by dividing the plurality of mobile stations into at least one group, the method including enabling an index element in a group index corresponding to a group to which a mobile station (MS) scheduled to transmit data belongs and placing a group allocation information element including the group index at a beginning of a MAP.

The enabling step may include enabling an index element in a group index corresponding to a group which an MS scheduled to transmit real-time traffic data belongs, preferentially selecting an MS belonging to the enabled group among MSs scheduled to transmit non-real-time traffic data, and enabling an index element in the group index corresponding to a group to which the selected MS belongs.

The enabling step may include enabling an index element in a group index corresponding to a group indicated by a group ID calculated using a total number of groups and a MAC address, the total number of groups being included in a DCD message, the MAC address being extracted from a ranging request of the MS.

The enabling step may include indicating whether or not a broadcast information element is enabled in at least one index element in the group index.

The broadcast information element may be located at a position after the group allocation information element.

The group allocation information element may include a downlink group allocation information element defined using a reserved region of an extended-2 downlink interval usage code (DIUC) among DIUCs.

The group allocation information element may include an uplink group allocation information element defined using a reserved region of an extended-2 uplink interval usage code (UIUC) among UIUCs.

In accordance with an embodiment of the present invention, the second object can be achieved by providing a method for selectively receiving information elements according to group scheduling, wherein a MAP is read using information which schedules allocation of resources to a plurality of mobile stations divided into at least one group, the method including reading a group index of a group allocation information element from a MAP of a downlink frame, and skipping information elements of the MAP if an index element in the group index corresponding to a group to which a mobile station (MS) belongs is not enabled and reading information elements of the MAP until a connection ID of the MS is read if the index element in the group index corresponding to the group to which the MS belongs is enabled.

The step of reading the information elements may include identifying whether or not an index element in the group index corresponding to a group indicated by a group ID is enabled, wherein the group ID is calculated using a total number of groups and a MAC address of the MS, the total number of groups being included in a DCD message received from a base station (BS).

The step of reading the group index may include reading an index element indicating whether or not a broadcast information element is enabled from the group index and reading a broadcast information element located at a position after the group allocation information element if the broadcast information element is enabled.

The group allocation information element may include a downlink group allocation information element defined using a reserved region of an extended-2 downlink interval usage code (DIUC) among DIUCs.

The group allocation information element may include an uplink group allocation information element defined using a reserved region of an extended-2 uplink interval usage code (UIUC) among UIUCs.

In accordance with an embodiment of the present invention, the third object can be achieved by providing a mobile station (MS) that reads a MAP using information which schedules allocation of resources to a plurality of MSs divided into at least one group, the MS including a resource allocation checker to read a group index of a group allocation information element from a MAP of a downlink frame, and a selective receiver to skip information elements of the MAP if an index element in the group index corresponding to a group to which an MS belongs is not enabled, and to read information elements of the MAP until a connection ID of the MS is read if the index element in the group index corresponding to the group to which the MS belongs is enabled.

The resource allocation checker may read an index element indicating whether or not a broadcast information element is enabled from the group index, wherein the selective receiver reads a broadcast information element located at a position after the group allocation information element if the broadcast information element is enabled.

Advantageous Effects

According to the embodiments of the present invention, group scheduling information is transmitted to MSs using a group allocation IE to prevent the MSs from reading unnecessary information transmitted every frame, thereby reducing power consumption of the MSs.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Preferred embodiments of the present invention will now be described in detail with reference to the accompanying drawings. The embodiments of the present invention described below can be modified into various other forms and the scope of the present invention is not limited to the following embodiments.

Figure 2:
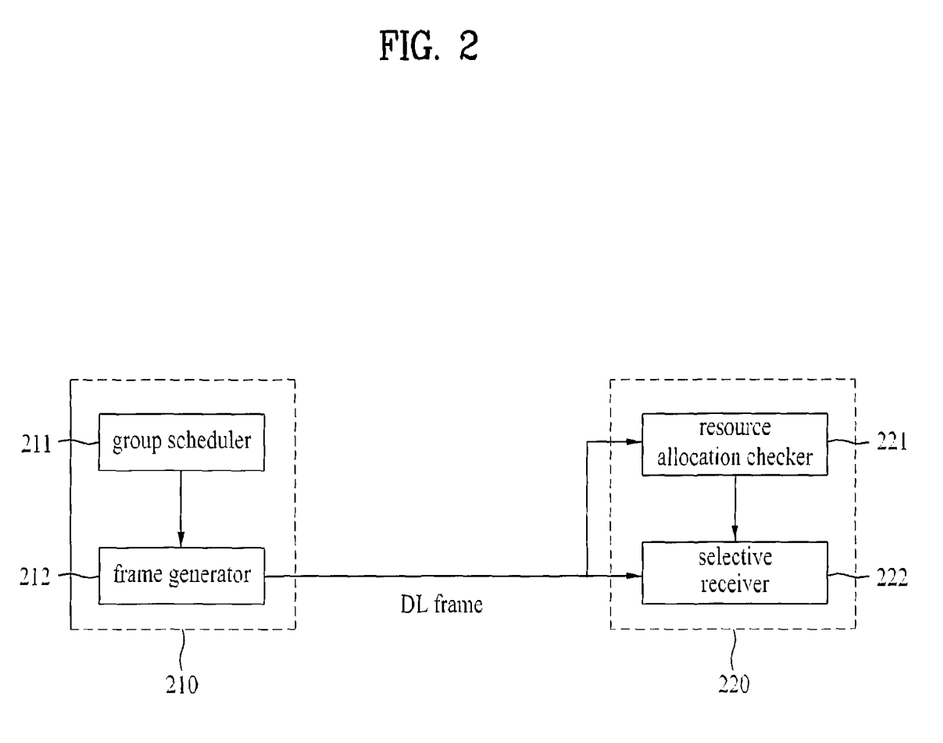
FIG. 2 is a block diagram of a BS and a mobile communication terminal or Mobile Station (MS) according to an embodiment of the present invention.

FIG. 2 is a block diagram of a Base Station (BS) and a mobile communication terminal or Mobile Station (MS) according to an embodiment of the present invention.

The BS of FIG. 2 includes a group scheduler 211 and a frame generator 212.

The group scheduler 211 enables a group index element in a group index corresponding to a group to which an MS scheduled to transmit data belongs. The group scheduler 211 manages enabling of the group index for allocating resources to a plurality of groups according to traffic states. The group scheduler 211 can insert information indicating whether or not a broadcast Information Element (IE) or a multicast IE has been enabled into at least one index element in the group index.

The frame generator 212 places a group allocation IE including the group index in a MAP at a beginning of the MAP.

In FIG. 2, the MS 220 is one of a plurality of MSs divided into one or more groups. The MS 220 includes a resource allocation checker 221 and a selective receiver 222.

The resource allocation checker 221 reads a group index of a group allocation IE from a MAP of a downlink frame.

The selective receiver 222 skips IEs of the MAP when an index element in the group index corresponding to a group to which the MS 220 belongs has not been enabled and reads IEs of the MAP until a connection ID of the MS 220 is read when the index element in the group index corresponding to the group to which the MS 220 belongs has been enabled. The selective receiver 222 can be designed to read a broadcast IE or a multicast IE located next to the group allocation IE when whether or not the broadcast IE or the multicast IE has been enabled is indicated in an index element of the group index read by the resource allocation checker 221.

The BS 210 schedules resource allocation such that MSs of the same group are allocated to one frame and transmits the allocation information, thereby allowing each MS to determine whether or not the frame includes resources allocated to the MS. When the frame includes no resources allocated to the MS, the MS 220 does not need to read all IEs included in the MAP. As a result, it is possible to reduce power consumption of the MS 220.

Reference will now be made to processes that the BS and the MS perform.

Figure 3:
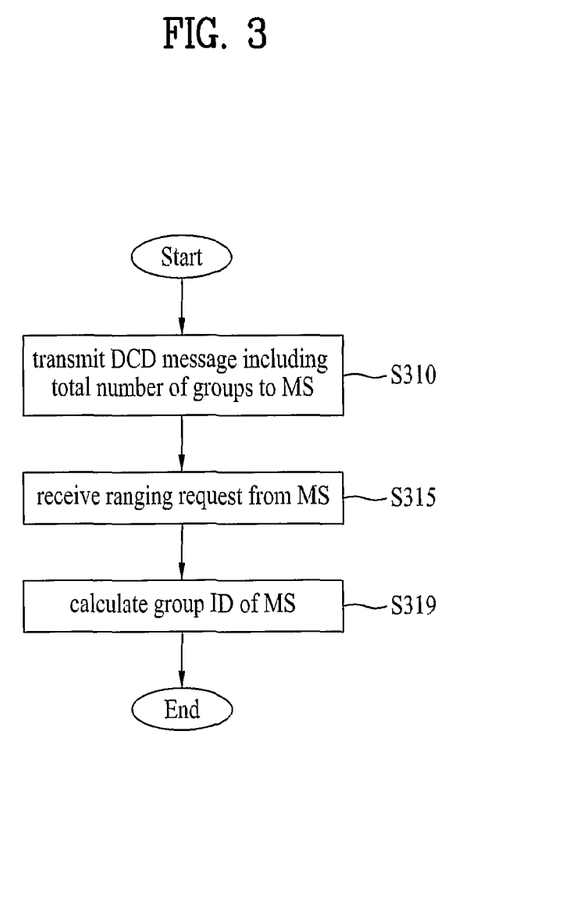
FIG. 3 is a flow chart illustrating a procedure for calculating a group ID in a BS according to an embodiment of the present invention.

FIG. 3 is a flow chart illustrating a procedure for calculating a group ID in a BS according to an embodiment of the present invention.

Specifically, FIG. 3 illustrates an initial procedure required to perform group scheduling described above.

First, the BS notifies MSs of the total number of groups (up to 255 groups) through a Downlink Channel Descriptor (DCD) message (S310). The DCD message is associated with Media Access Control (MAC) that describes characteristics of a downlink radio physical layer and is transmitted using a broadcast format or basic connection.

The BS receives a ranging request from an MS in a network entry and initialization procedure of the MS (S315).

The BS calculates a group ID of the MS using a MAC address included in a ranging request (RNG-REQ) of the MS, a hash value calculated using the MAC address, and the total number of groups (S319).

Table 4 is an example of a DCD-added parameter for group scheduling.

TABLE 4

| Name | Type (1 byte) | Length | Value |
| --- | --- | --- | --- |
| Total number of Group | 38 | 1 | The total number of group |

The MAC address can be obtained through a ranging request and the hash value can be obtained through a calculation method used to derive a MAC address hash value of the MS included in a MOB_PAG-ADV message. For example, the hash value is obtained by calculating a CRC-24 using the MAC address and a generator polynomial of Mathematical Expression 3.

$$g(D)=D^{24}+D^{23}+D^{18}+D^{17}+D^{14}+D^{11}+D^{10}+D^{7}+D^{6}+D^{5}+D^{4}+D^{3}+D+1 \quad \text{MATHEMATICAL EXPRESSION 3}$$

As shown in Mathematical Expression 4, the group ID of the MS is obtained by adding 1 to the remainder of division of the hash value obtained through the above equation by a value obtained by subtracting 1 from the total number of groups.

$$\text{GROUP ID}(i_{MS})=(\text{HASH}(i_{MS}) \bmod (\text{TOTAL GROUP}-1))+1 \quad \text{MATHEMATICAL EXPRESSION 4}$$

Here, the group ID 0 is used for broadcast or multicast.

Preferably, a DL group allocation IE may be defined as allocation information of group scheduling of downlink using a reserved region 0x0D of an extended-2 downlink interval usage code (DIUC) of the DIUC 14. Table 5 illustrates a format of a DL group allocation IE.

TABLE 5

| Syntax | Size | notes |
| --- | --- | --- |
| DL group allocation IE { | — | — |
| Extended-2 DIUC | 4 | 0x0D |
| Length | 8 | |
| Group Index | variable | bitmap |
| } | | |

Preferably, a UL group allocation IE may be defined as allocation information of group scheduling of uplink using a reserved region 0x0C of an extended-2 uplink interval usage code (UIUC) of the UIUC 14. Table 6 illustrates a format of a UL group allocation IE.

TABLE 6

| Syntax | Size | notes |
| --- | --- | --- |
| UL group allocation IE { | — | — |
| Extended-2 UIUC | 4 | 0x0C |
| Length | 8 | |
| Group Index | variable | bitmap |
| } | | |

On the other hand, an MS, which is not able to identify the extended-2 DIUC or extended-2 UIUC, ignores such information and reads all MAP IEs as in the conventional method.

Figure 4:
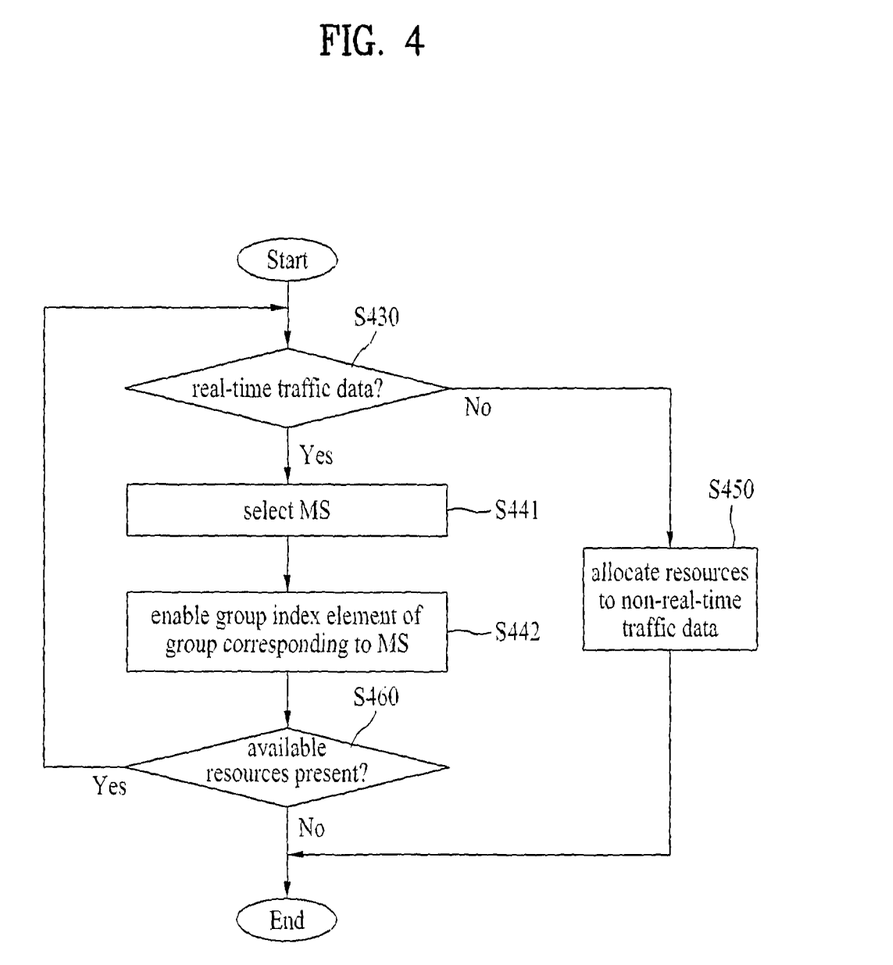
FIG. 4 is a flow chart of a group scheduling method according to an embodiment of the present invention.

FIG. 4 is a flow chart of a group scheduling method according to an embodiment of the present invention.

The BS performs processes of steps S430 to S460 of FIG. 4 every frame. First, the BS performs scheduling to allow traffic sensitive to delay such as Voice Over IP to preoccupy resources (S430-S442, S460).

More specifically, when there is real-time traffic data to be transmitted to the BS (S430), the BS selects an MS scheduled to transmit the real-time traffic data (S441) and enables an index element in a group index of a group to which the MS belongs (S442). For example, the BS sets a bit in the group index corresponding to the group corresponding to the MS that has occupied resources to "1".

When the BS has no traffic data to be transmitted or when the BS has completed allocation of resources to real-time traffic data (S430), the BS performs allocation of resources to non-real-time traffic data (S450) and terminates the procedure.

Then, if there are resources available for allocation to real-time data (S460), the BS repeats the processes of steps S430-S442 to perform scheduling to allow traffic sensitive to delay to preoccupy resources. If there are no resources available for allocation to data to be transmitted from the BS (S460), the BS terminates all processes.

As the BS broadcasts a group allocation IE, which is information of resources allocated through the above processes, to MSs, the MSs can determine, every frame, which groups have occupied resources of the frame.

Figure 5:
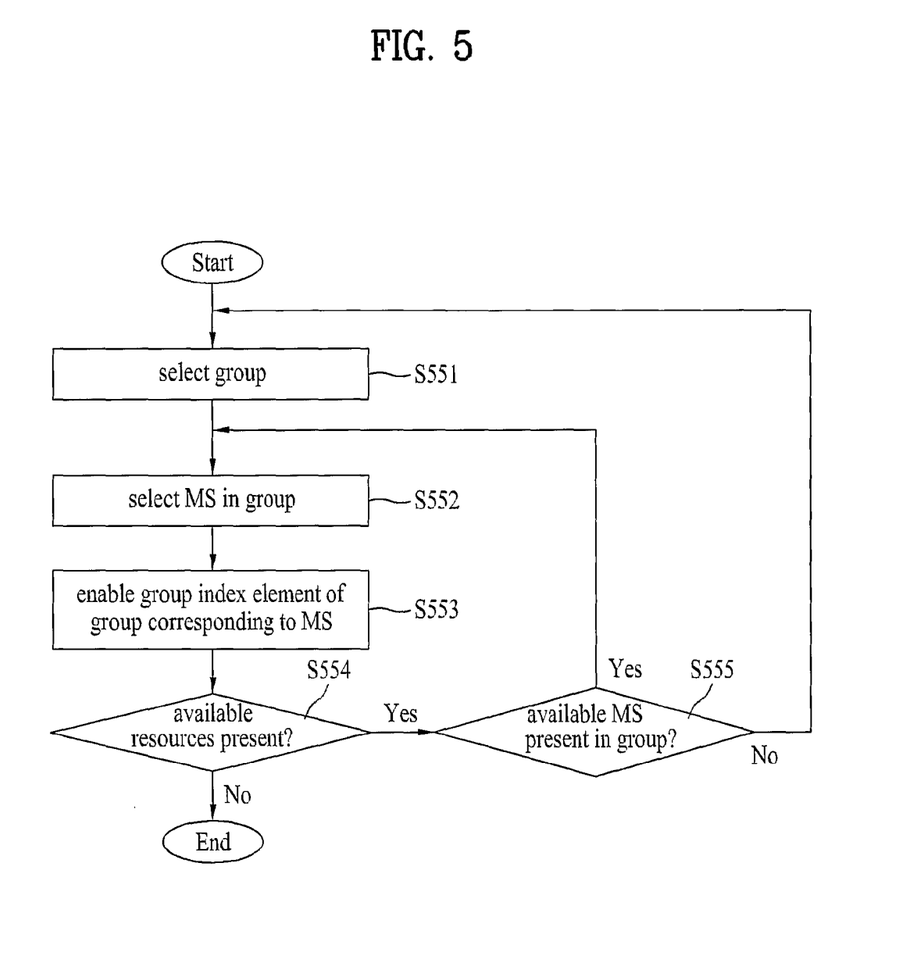
FIG. 5 is a detailed flow chart of a procedure for allocating resources to non-real-time traffic data in the method of FIG. 4.

FIG. 5 is a detailed flow chart of a procedure for allocating resources to non-real-time traffic data in the method of FIG. 4.

After completing the procedure for allocating resources to real-time traffic data, the BS determines a group to be scheduled taking into consideration information (e.g., group index information) of a group that has already occupied resources, the number of MSs that have data to be transmitted in the same group, the size of data, etc (S551). For example, the BS can preferentially select a group enabled for real-time traffic data transmission among MSs scheduled to transmit non-real-time traffic data.

Then, the BS selects an MS in the selected group (S552) and enables a group index element corresponding to of the group to which the selected MS belongs (S553). For example, the BS sets a bit in the group index corresponding to the group corresponding to the MS that has occupied resources to "1". The BS may set all bits in the group index to "1" according to scheduling results. It is preferable that the BS perform a group index enabling process (S553) once per group. This is because there is no need to repeat the group index enabling process (S553) for the same group index.

Preferably, the BS performs scheduling to allow MSs belonging to the same group to occupy resources of one frame in the processes of steps S551-S553, thereby minimizing the number of MSs that read MAP IEs.

Then, if available resources for allocation to non-real-time traffic data are present (S554), the BS determines whether or not an available MS is present in the selected group (S555). Here, if an available MS is present in the selected group, the BS selects the available MS in the selected group (S552) and, if no available MS is present in the selected group, the BS selects another group (S551).

On the other hand, if there are no available resources for allocation to non-real-time traffic data (S554), the BS terminates all processes.

Figure 6A:
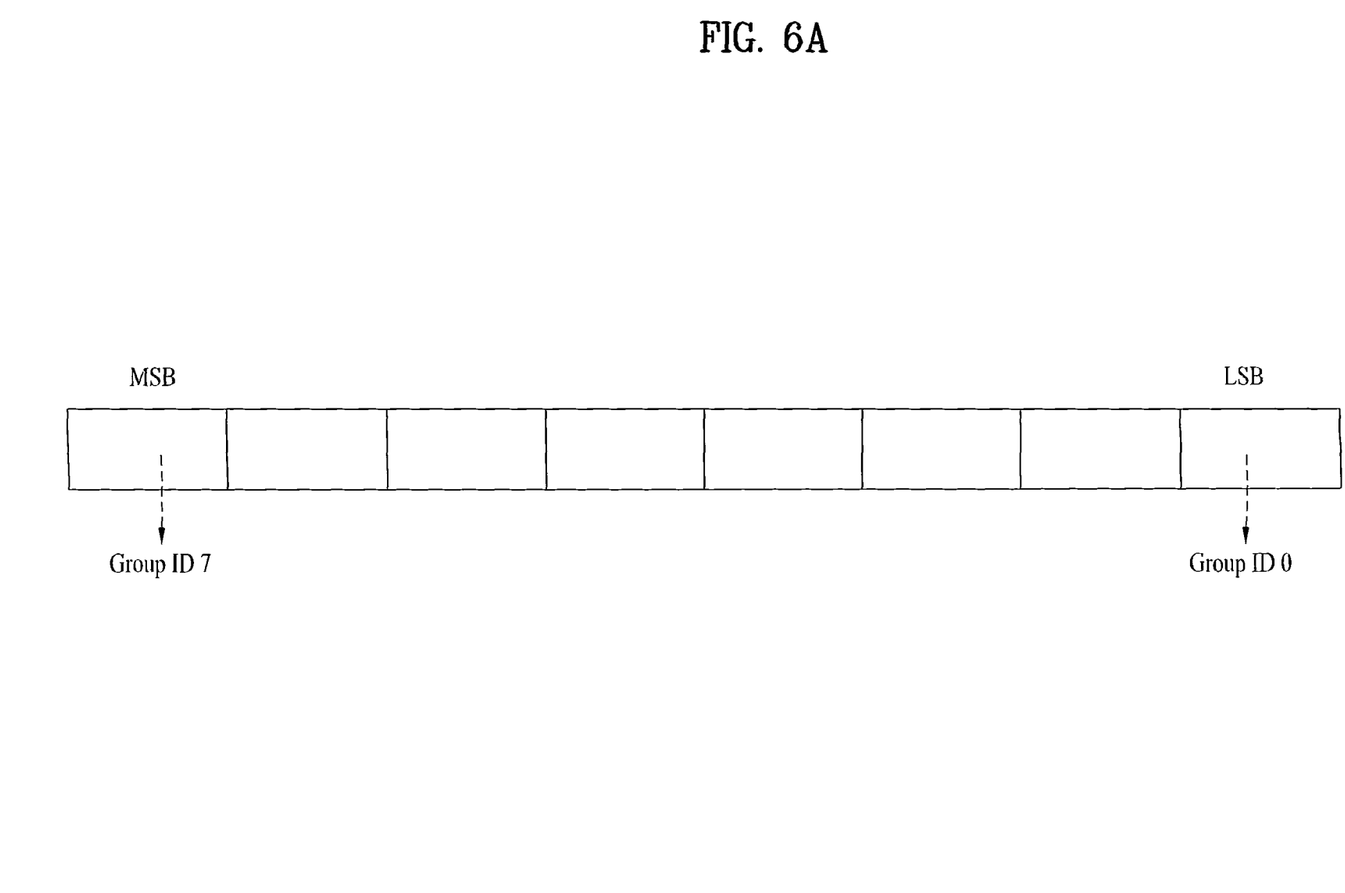
FIG. 6A illustrates an example group index applied to the method of FIG. 4.

FIG. 6A illustrates an example group index applied to the method of FIG. 4.

FIG. 6A illustrates an example group index format when the total number of groups is 8. Here, the length of the group index element is 1 byte. In FIG. 6a, the Most Significant Bit (MSB) corresponds to a group ID of 7 and the Least Significant Bit (LSB) corresponds to a group ID of 0.

Figure 6B:
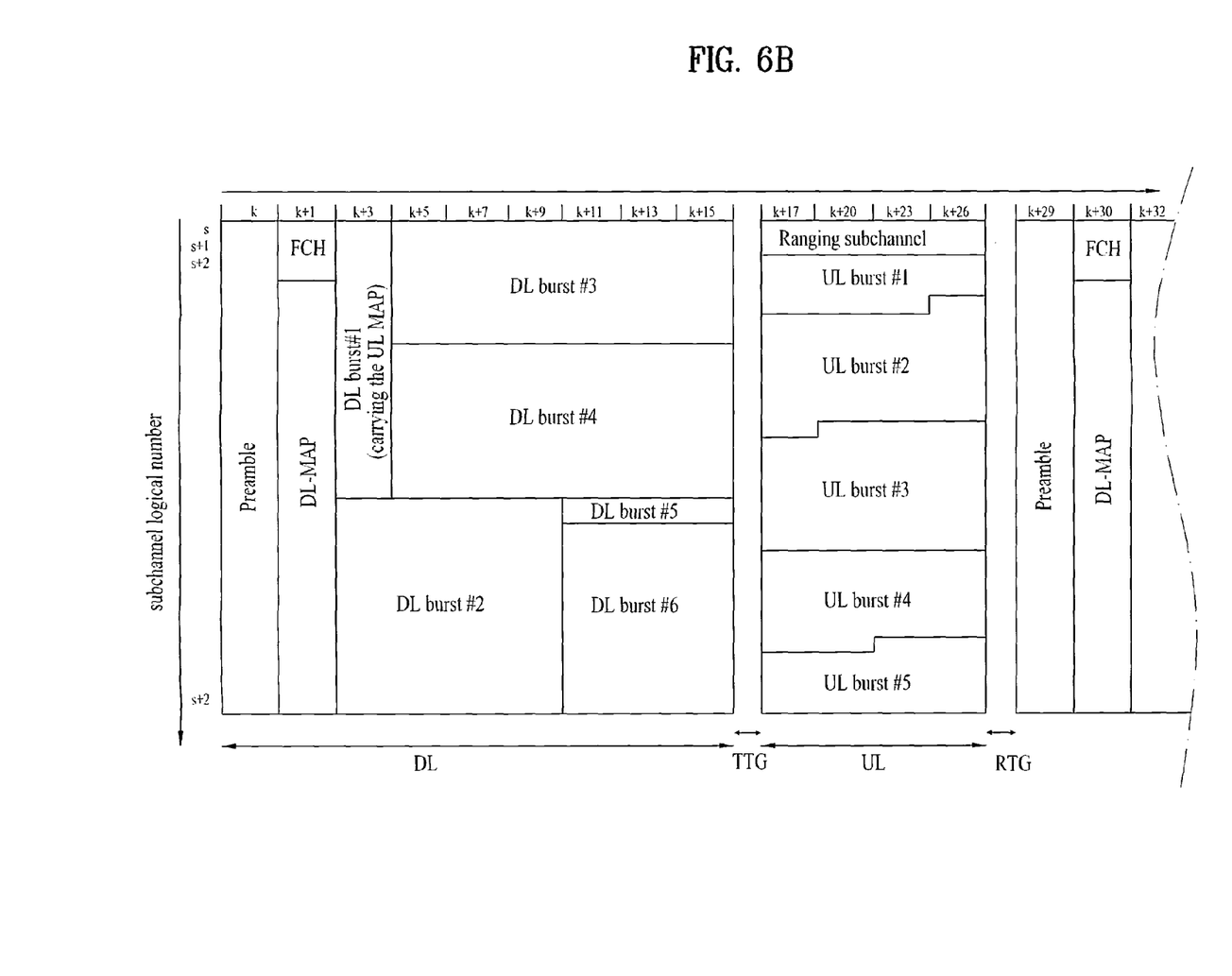
FIG. 6B illustrates an example frame structure generated according to the resource allocation procedure of FIG. 4.

FIG. 6B illustrates an example frame structure generated according to the resource allocation procedure of FIG. 4.

As shown in FIG. 6B, a data frame of a broadband wireless access communication system includes both downlink (DL) and uplink (UL) regions and also includes a Transmit Time Gap (TTG) and a Receive Time Gap (RTG) between the DL and UL regions. In the example of FIG. 6B, the frame structure includes a DL subframe for downlink at the left side and includes an UL subframe for downlink at the right side. Each frame includes one preamble, a DL burst #1 including a UL MAP, and a DL MAP.

In the DL MAP and the UL MAP, DL and UL subframes for uplink and downlink are divided into a number of sections and a Connection ID (CID), a DIUC, a UIUC, and position information of each section are assigned to the section. Here, the CID is a subscriber identification code indicating a subscriber MS, to which the corresponding section is carrying data, and the DIUC and UIUC are values indicating the purpose of use of the section, a modulation type, and an encoding code (for example, a Frame Error Control (FEC) code). Thus, the DIUC and UIUC indicate the purpose of use of data of the corresponding section, a modulation method through which the data has been modulated, and a code through which the data has been encoded.

In this structure, group allocation IEs can be disposed at the respective beginnings of MAPs. That is, as shown in FIG. 6B, the DL group allocation information element can be placed at the beginning of the DL MAP and the UL group allocation information element can be placed at the beginning of the DL burst #1 (i.e., the DL MAP). In addition, the broadcast IE or the multicast IE whose group ID is "0" can be placed immediately after each group allocation IE.

Figure 7:
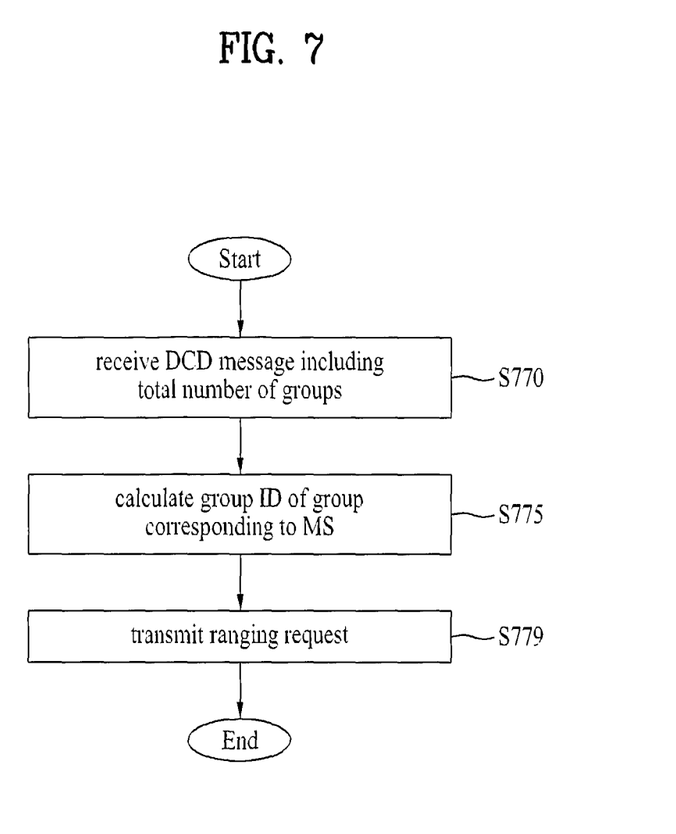
FIG. 7 is a flow chart of a procedure for calculating a group ID in an MS according to an embodiment of the present invention.

FIG. 7 is a flow chart of a procedure for calculating a group ID in an MS according to an embodiment of the present invention.

The steps S770-S779 of FIG. 7 are processes required for the MS to perform group scheduling.

First, the MS receives a DCD message including the total number of groups from the BS (S770). The MS then calculates a group ID of the MS using the same generator polynomial as that of the BS, a MAC address of the MS, the total number of groups received through the DCD message (S775). Finally, the MS transmits a ranging request to the BS (S779).

Figure 8:
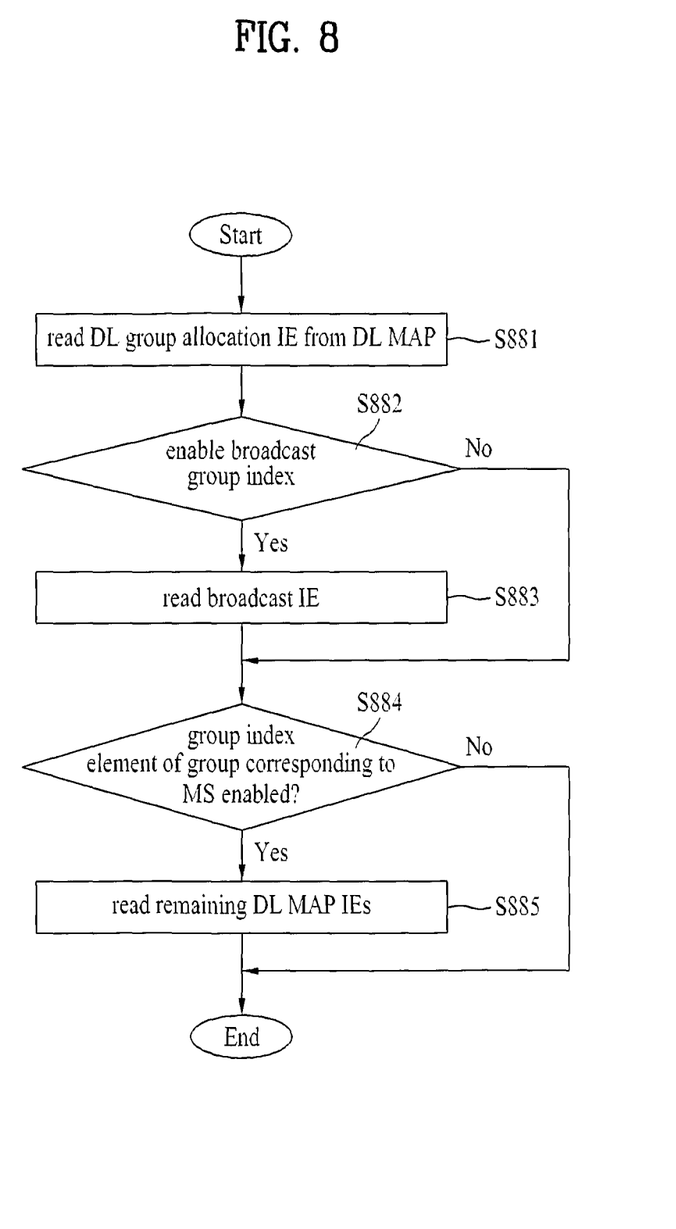
FIG. 8 is a flow chart of a method for selectively receiving an IE according to group scheduling according to an embodiment of the present invention.

FIG. 8 is a flow chart of a method for selectively receiving an IE according to group scheduling according to an embodiment of the present invention.

First, the MS receives a group allocation IE of a MAP transmitted every frame and checks whether or not any resources have been allocated to a group to which the MS belongs.

More specifically, the MS reads a downlink group allocation IE from a DL MAP (S881).

If a broadcast IE or a multicast IE has been enabled in the read downlink group allocation IE (S882), the MS reads the broadcast IE or the multicast IE located next to the downlink group allocation IE (S883). If the broadcast IE or the multicast IE has not been enabled in the read downlink group allocation IE (S882), the MS proceeds to step S884 to check whether or not any resources have been allocated to the group to which the MS belongs.

When a group index element in the group index corresponding to the group to which the MS belongs has been enabled, the MS reads remaining DL MAP IEs until a CID of the MS is read (S885), otherwise the MS terminates the procedure.

For example, if a 0th value of the group index has been set to "1" and a bit in the group index corresponding to the group to which the MS belongs has been set to "1", the MS reads the broadcast IE or multicast IE and remaining IEs until a CID of the MS is detected. If the 0th value of the group index has been set to "1" and the bit in the group index corresponding to the group to which the MS belongs has not been set to "1", the MS reads only the broadcast IE or multicast IE. If the 0th value of the group index has not been set to "1" and the bit in the group index corresponding to the group to which the MS belongs has been set to "1", the MS may read remaining IEs until the CID of the MS is detected. In situations other than those of the above cases, the MS does not need to read MAP IEs. That is, if the 0th value of the group index has not been set to "1" and the bit in the group index corresponding to the group to which the MS belongs has not been set to "1", the MS skips reading the MAP.

Figure 9:
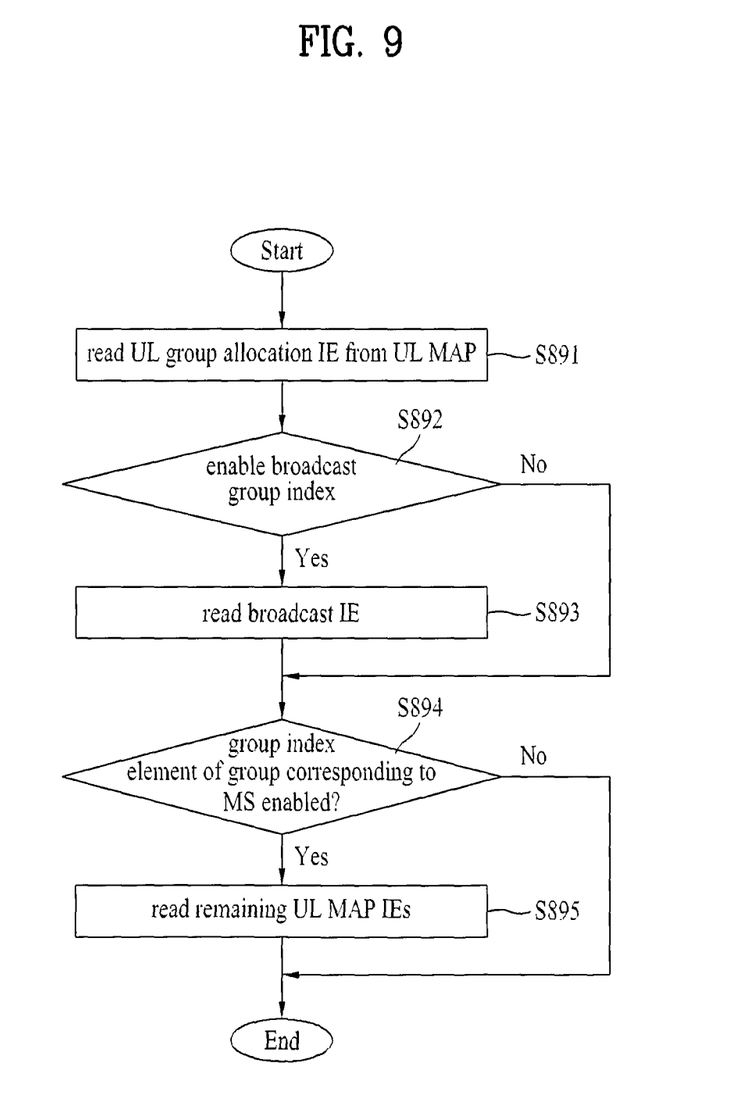
FIG. 9 is a flow chart of a method for selectively receiving an IE according to group scheduling according to an embodiment of the present invention.

FIG. 9 is a flow chart of a method for selectively receiving an IE according to group scheduling according to an embodiment of the present invention.

Although the procedure of FIG. 9 is similar to that of FIG. 8, the procedure of FIG. 9 is performed on the UL MAP.

First, the MS reads an uplink group allocation IE from a UL MAP (S891).

If a broadcast IE or a multicast IE has been enabled in the read uplink group allocation IE (S892), the MS reads the broadcast IE or the multicast IE located next to the uplink group allocation IE (S893). If the broadcast IE or the multicast IE has not been enabled in the read uplink group allocation IE (S892), the MS proceeds to step S894 to check whether or not any resources have been allocated to the group to which the MS belongs.

When a group index element in the group index corresponding to the group to which the MS belongs has been enabled, the MS reads remaining UL MAP IEs until a CID of the MS is read (S895), otherwise the MS terminates the procedure.

When it is assumed that the frame structure of FIG. 6B is employed, it is preferable that the procedure of FIG. 9 be performed after the procedure of FIG. 8 is performed.

Although the present invention has been described with reference to the embodiments illustrated in the drawings, the embodiments are only illustrative and it will be apparent to those skilled in the art that various modifications and variations can be made from the embodiments. Such modifications and variations should be construed as being included in the scope of the invention. Thus, the scope of the invention should be determined based on the spirit of the appended claims.

Industrial Applicability

The present invention can be applied to relevant algorithms and devices of a broadband wireless access system including an algorithm that generates group allocation information in a wireless access system, an algorithm that skips unnecessary information using group allocation information, a scheduling device that generates group allocation information, a base station device including the scheduling device, and a terminal that selectively receives IEs using group allocation information received from the base station device.

The invention claimed is:

1. A method of a base station of group scheduling for scheduling allocation of resources to a plurality of mobile stations by dividing the plurality of mobile stations (MSs) into groups, the method comprising:

transmitting a Downlink Channel Descriptor (DCD) message including a total number of groups for the group scheduling;

receiving ranging requests from the plurality of MSs;

calculating a group identifier (ID) for each of the plurality of MSs using the total number of groups for the group scheduling and Media Access Control (MAC) addresses extracted from the received ranging requests;

determining whether each of the plurality of MSs is to transmit real-time traffic data or non-real-time traffic data;

selecting a first set of MSs comprising the MSs that are to transmit real-time traffic data for the group scheduling;

enabling one or more index elements in a first group index corresponding to one or more groups to which the first set of MSs belong;

selecting one or more groups for a remaining group scheduling if available resources are present after completing a resource allocation to the one or more groups to which the first set of MSs data belong;

selecting a second set of MSs comprising one or more MSs that are to transmit non-real-time traffic data for the group scheduling;

enabling one or more index elements in a second group index corresponding to the one or more groups to which the second set of MSs belong, wherein the second group index comprises a plurality of index elements, each of the plurality of index elements having a length of 1 bit and corresponding to one of the groups; and transmitting a MAP comprising:

a group allocation information element including a group index having enabled index elements together with one or more not enabled index elements; and one more connection IDs (CIDs) of the selected MSs, wherein enabling the one or more index elements in the first group index corresponding to the one or more groups to which the first set of MSs belong comprises setting an index element having a length of 1 bit in the first group index corresponding to a group indicated by at least one of the calculated group IDs.

2. The method of claim 1, wherein the group allocation information element is located at a beginning of the MAP.

3. The method of claim 1, wherein enabling the one or more index elements in the first group index corresponding to the one or more groups to which the first set of MSs belong further comprises selecting an MS belonging to the enabled group among the second set of MSs.

4. The method of claim 1, wherein enabling the one or more index elements in the first group index corresponding to the one or more groups to which the first set of MSs belong further comprises indicating whether or not a broadcast information element is enabled in at least one index element in the first group index.

5. The method of claim 4, wherein the broadcast information element is located at a position after the group allocation information element.

6. The method of claim 1, wherein the group allocation information element includes a downlink group allocation information element defined using a reserved region of an extended-2 downlink interval usage code (DIUC) among DIUCs.

7. The method of claim 1, wherein the group allocation information element includes an uplink group allocation information element defined using a reserved region of an extended-2 uplink interval usage code (UIUC) among UIUCs.

\* \* \* \* \*